(12) United States Patent
Cardie et al.

(10) Patent No.: US 9,092,514 B2
(45) Date of Patent: *Jul. 28, 2015

(54) SYSTEM AND METHOD FOR AUTOMATICALLY SUMMARIZING FINE-GRAINED OPINIONS IN DIGITAL TEXT

(71) Applicant: Cornell University, Ithaca, NY (US)

(72) Inventors: Claire Cardie, Ithaca, NY (US); Vaselin Stoyanov, Ithaca, NY (US); Eric Breck, Ithaca, NY (US); Yejin Choi, Ithaca, NY (US)

(73) Assignee: Cornell Univeristy, Cornell Center for Technology, Enterprise & Commercialization, Ithaca, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/629,004

(22) Filed: Sep. 27, 2012

(65) Prior Publication Data
US 2013/0024183 A1 Jan. 24, 2013

Related U.S. Application Data

(63) Continuation of application No. 11/927,456, filed on Oct. 29, 2007, now Pat. No. 8,280,885.

(51) Int. Cl.
G06F 17/30 (2006.01)
(52) U.S. Cl.
CPC .... *G06F 17/30719* (2013.01); *G06F 17/30722* (2013.01)
(58) Field of Classification Search
CPC .................................................. G06F 17/30722

USPC ............... 706/46, 56; 707/737, 755, 758, 707/999.006, 999.101; 715/764
See application file for complete search history.

(56) References Cited

U.S. PATENT DOCUMENTS

| 7,130,777 | B2 | 10/2006 | Garg et al. |
| 7,185,065 | B1 | 2/2007 | Holtzman et al. |
| 7,188,078 | B2 | 3/2007 | Arnett et al. |
| 7,293,019 | B2 | 11/2007 | Dumais et al. |
| 7,523,085 | B2 * | 4/2009 | Nigam et al. ................. 706/55 |
| 7,930,302 | B2 * | 4/2011 | Bandaru et al. ............... 707/737 |
| 2006/0242040 | A1 | 10/2006 | Rader |
| 2007/0282867 | A1 * | 12/2007 | McAllister et al. .......... 707/100 |
| 2009/0319518 | A1 * | 12/2009 | Koudas et al. .................... 707/5 |
| 2010/0023311 | A1 | 1/2010 | Subrahmanian et al. |

OTHER PUBLICATIONS

International Search Report dated Dec. 24, 2008 in related Application No. PCT/US08/81632 (2 pages).

* cited by examiner

*Primary Examiner* — Marc Filipczyk
(74) *Attorney, Agent, or Firm* — Dentons US LLP

(57) ABSTRACT

A method and system for automatically summarizing fine-grained opinions in digital text are disclosed. Accordingly, a digital text is analyzed for the purpose of extracting all opinion expressions found in the text. Next, the extracted opinion expressions (referred to herein as opinion frames) are analyzed to generate opinion summaries. In forming an opinion summary, those opinion frames sharing in common an opinion source and/or opinion topic may be combined, such that an overall opinion summary indicates an aggregate opinion held by the common source toward the common topic.

29 Claims, 4 Drawing Sheets

"The Australian Press launched a bitter attack on Italy."

OPINION EXPRESSION 12

OPINION TRIGGER 14

FIVE (5) COMPONENTS OF AN OPINION FRAME

- (1) OPINION TRIGGER
- (2) POLARITY
  POSITIVE
  NEGATIVE
  NEUTRAL
- (3) STRENGTH/INTENSITY
  LOW - - - EXTREME
- (4) SOURCE (OPINION HOLDER)
- (5) TARGET (TOPIC)

| OPINION FRAME | |
|---|---|
| SOURCE | "The Australian Press" |
| POLARITY | negative sentiment |
| INTENSITY | high |
| TARGET | "Italy" |
| TRIGGER | "launched a bitter attack" |

[Source American public] opinion has [- turned increasingly against] [Target the Iraq war]. The fourth anniversary of the Iraq war this week was marked by anti-[Target war] [- protests] during the weekend. There were [Source some people] out to [+ support] [Target the war] as well, fewer in number but no less vocal.

[Source Bush] has repeatedly [- opposed] [Target setting timelines for withdrawing U.S. troops from Iraq]. [Source He] reiterated [Source the administration]'s stance that [- premature] [Target troop withdrawal from Iraq] would leave security to Iraqi forces that [-cannot yet cope] with it on their own and allow [Target groups like al Qaeda] to establish a base from which to [- attack] the U.S.

14

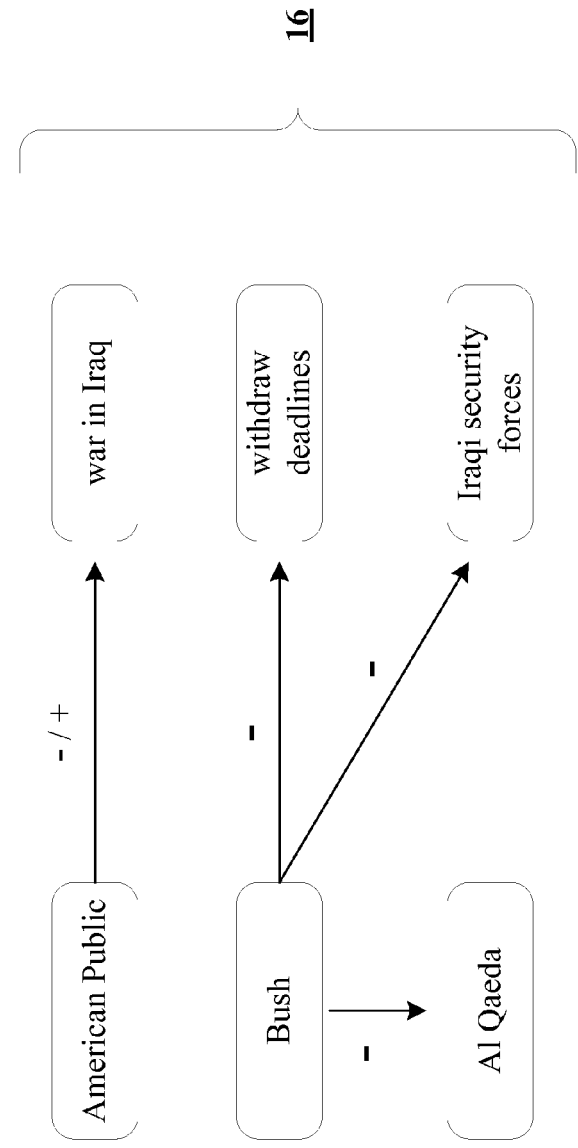

FIG. 2

SYSTEM AND METHOD FOR AUTOMATICALLY SUMMARIZING FINE-GRAINED OPINIONS IN DIGITAL TEXT

CROSS REFERENCE TO RELATED APPLICATIONS

The present application is a continuation of U.S. Nonprovisional application Ser. No. 11/927,456 filed 29 Oct. 2007, issuing as U.S. Pat. No. 8,280,885 on 2 Oct. 2012; each of which is incorporated herein by reference in its entirety.

FIELD OF THE INVENTION

The invention generally relates to computer-implemented opinion analysis.

BACKGROUND

Opinion analysis is concerned with extracting attitudes, beliefs, emotions, opinions, evaluations, and sentiment from digital texts. Opinion analysis has received much research attention lately, motivated by the desire to provide information analysis applications in the arenas of government, business, and politics. The types of applications desired include question answering (QA) applications, for example, that enable complex querying of the form, "How does entity X feel about topic Y?" Other desired applications include opinion-oriented information retrieval, clustering, opinion tracking, and document-, collection- and corpus-level opinion exploration. Enabling such applications requires an information extraction system that can extract opinion summary information from digital texts, such as news articles, blog postings, email (referred to herein generally as documents).

When a reader reads and analyzes a document, the reader is likely to process subjective language to determine the attitudes, beliefs, emotions, opinions, evaluations, sentiments or private state of mind of the author, or some other person referred to in the document, with respect to a particular topic or idea expressed in the document. Here, "private state" is used in a general sense to describe mental and emotional states that cannot be directly observed or verified. For example, the word "loves" in "John loves Mary" is an explicit mention of John's private state toward Mary. Similarly, the word "fears" in "Mary fears big cities" explicitly denotes a private state of Mary. There are also indirect expressions of private state: In the sentence "John said the book is a complete fabrication of the truth", the phrase "a complete fabrication" divulges John's negative opinion about the book. For simplicity, throughout the remainder of this patent document, the term "opinion" is used to cover all types of private states expressed in subjective language.

While readers tend to naturally process subjective language when reading, automating the process to summarize and present opinions expressed in documents is a challenge. To date, much of the work done in the area of automating opinion analysis has been focused on the problem of identifying opinions at the document level. Document level analysis can be referred to as coarse-grained opinion analysis, where the goal is to determine whether the overall sentiment expressed in a single document is either positive (e.g., "thumbs up"), or negative (e.g., "thumbs down").

The coarse-grained opinion analysis approach can be problematic for a number of reasons. First, a single article or text will often have multiple opinion expressions—with each opinion expression possibly associated with a different source (e.g., the opinion holder) and related to a different topic (e.g., the target or subject of the opinion). Consequently, expressing an overall summary at the document level, and attributing the opinion to one source (e.g., the author of the article) fails to recognize the existence of multiple opinion sources in a single article. For instance, a news article dealing with one or more political issues may express the differing opinions of two opposing politicians, thereby making it difficult to express the overall sentiment of the article in a single summary statement. Furthermore, expressing an overall opinion summary at the document level fails to recognize that the article may include a variety of opinion expressions on different topics. In a news article dealing with one or more political issues, the article may express the opinions of the opposing politicians on a variety of political issues. Therefore, expressing an overall opinion summary at the document level in a single opinion statement fails to reflect the various opinions on the different political issues. Consequently, the type and quality of information extracted from documents with course-grained opinion analysis will not enable the types of rich querying applications described above.

SUMMARY

A system and method for automatically summarizing fine-grained opinions in digital text are disclosed. Accordingly, a digital text, collection of digital texts, or document corpus, is analyzed for the purpose of identifying expressions of opinion. That is, a digital text is analyzed to identify those portions of the text where the author, or a person or entity identified in the text, is expressing an opinion, belief or attitude toward a particular topic. In one case, for each opinion expression identified, the component parts of the opinion expression are extracted and stored in a data structure referred to herein as an opinion frame. An opinion frame includes the following component parts of an opinion expression: an opinion source, an opinion trigger, an opinion topic, an opinion polarity and an opinion strength.

After all the opinion expressions have been identified, and an opinion frame has been generated for each opinion expression, opinion summaries are formed. In one case, there may be at least two general types of opinion summaries—overall opinion summaries and opinion set summaries. For an overall opinion summary, each opinion frame that shares in common an opinion source and opinion topic is combined. For instance, when two opinion frames have the same real-world opinion source and real-world opinion topic, regardless of whether the opinion source and/or opinion topic are expressed in the digital text with the same language, the corresponding opinion frames are combined to form an overall opinion summary. Various methods may be used to combine the opinion frames. For example, the opinion polarities are averaged, taking into consideration the opinion strengths. An overall opinion summary may also be generated for those opinion frames that share in common only an opinion topic. The second type of opinion summary—an opinion set summary—is formed by simply linking or otherwise associating (without aggregating) those opinion frames that share in common an opinion source and/or opinion topic. Other aspects of the patent application will become apparent from the detailed description that follows.

BRIEF DESCRIPTION OF THE DRAWINGS

FIG. 1 illustrates an example of an opinion frame associated with an opinion expression extracted from a digital text.

FIG. 2 illustrates an example of an opinion summary broken down by source and topic.

DESCRIPTION

Figure 3:
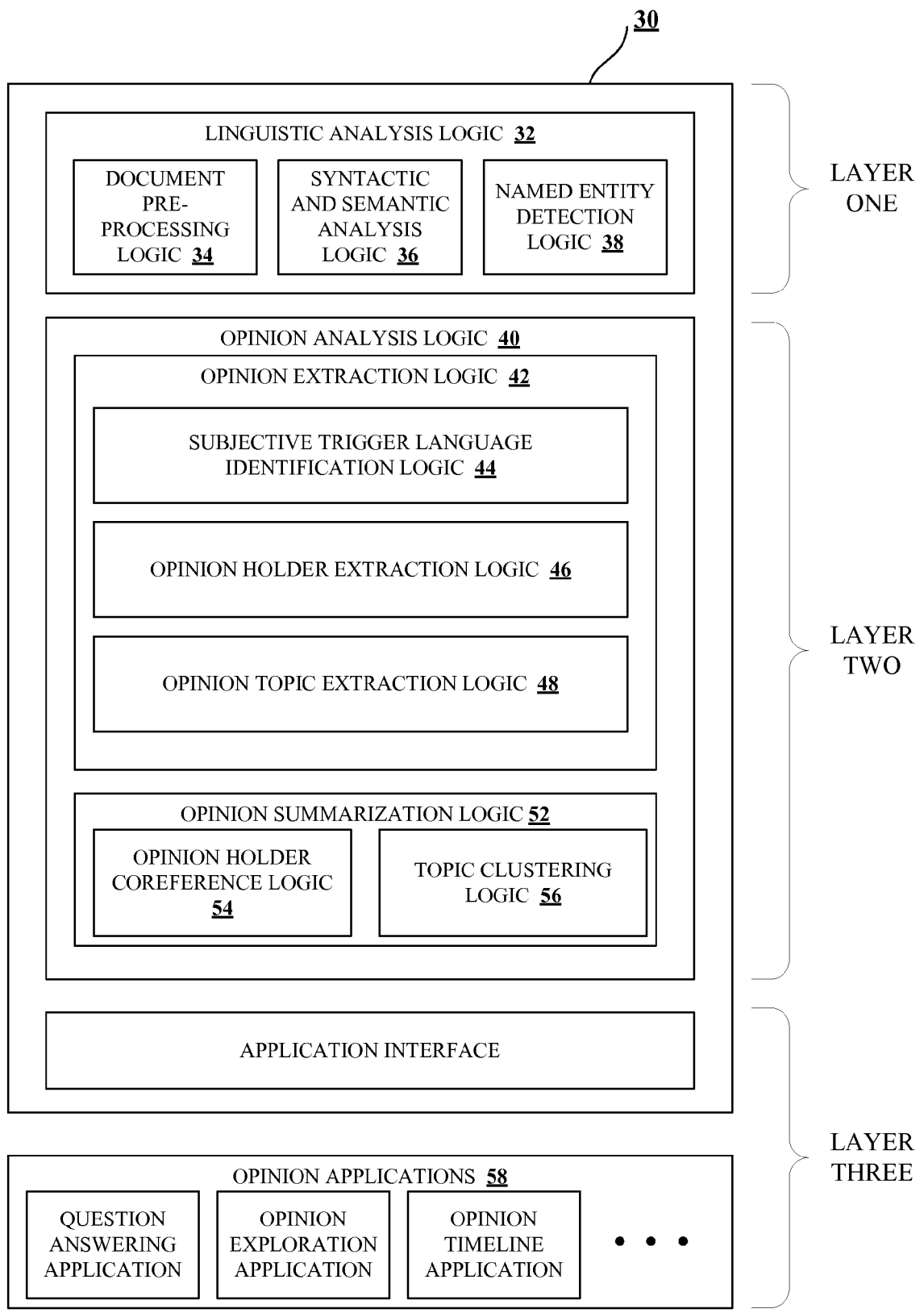
FIG. 3 illustrates an example of the logical or functional components of a system for identifying, extracting, and summarizing opinions in a digital text.

An apparatus and method for identifying, extracting, summarizing, and presenting opinions from digital text (documents) are disclosed. For example, a digital text (e.g., an article, blog posting, product review, and/or email) is analyzed to extract opinion expressions. In this context, an opinion expression is simply a phrase, clause, sentence or some combination within the digital text being analyzed that expresses an opinion. The component parts of each opinion expression identified in a document are organized into several data fields of a data structure referred to herein as an opinion frame. Accordingly, each opinion frame includes five data fields—one data field each for the 1) opinion source (e.g., the opinion holder), 2) the opinion target (e.g., the topic, subject, or idea of the opinion), 3) the opinion polarity (e.g., positive, neutral, negative), 4) the opinion strength or intensity (e.g., low, mild, extreme), and 5) the opinion trigger (e.g., the word, words, or phrase from the digital text that indicate an opinion is being expressed).

After the opinion expressions have been identified, and the opinion frames have been formed, the digital text is analyzed to associate different opinion expressions that are related. For example, if two or more opinion expressions are associated with the same opinion source and/or opinion topic, those opinion expressions are associated for purposes of determining and generating an opinion summary. In practical terms, this may mean that two or more opinion frames are stored in a relational database so as to indicate their association, or are otherwise linked (e.g., in a data structure). By identifying those opinion expressions that share a common source and topic, opinion summaries may be determined based on an opinion source and/or opinion topic basis, for example, entity X's opinion on topic Y. This enables the formation of opinion summaries on a source and/or topic basis in contrast to prior art systems, which form an opinion summary statement on the document level. Such opinion summary information can be utilized to answer queries in the form, "What is entity X's view of topic Y?", which may be employed in question answering (QA) applications, or other opinion-related querying applications.

As described in greater detail below, various algorithms and techniques may be utilized to determine the real-world opinion source for opinion expressions, particularly when the text uses various names, pronouns and so forth, to refer to the same real-world person or entity. Similarly, algorithms and techniques are utilized to determine a common topic amongst various opinion expressions when the text of the opinion expressions uses different words or phrases to refer to the same topic (e.g., "the Iraq war", and, "the war in Iraq").

Extraction of Opinions—Opinion Frames

FIG. 1 illustrates an example of an opinion frame 10 associated with an opinion expression 12 extracted from a document. The opinion expression 12 of FIG. 1 is an example of a fine-grained opinion extracted from a document. As illustrated in FIG. 1, the opinion expression includes five different attributes or component parts that are identified to form an opinion frame. The five attributes are: 1) opinion trigger, 2) opinion polarity, 3) opinion strength/intensity, 4) opinion source, and 5) opinion topic/target. Although the opinion expression 12 shown in FIG. 1 is included within a single sentence, it will not always be the case that the component parts of an opinion expression be contiguous and form a sentence. For example, the opinion holder may be indicated in one sentence, while the opinion trigger and opinion topic are in a second sentence. It will be appreciated by those skilled in the art that in alternative cases, an opinion frame may utilize more or less than the five fields illustrated in FIG. 1 and described in detail below.

Referring again to FIG. 1, the opinion trigger 14 is a word or phrase that signals the expression of opinion in the digital text. In the example opinion expression of FIG. 1, the opinion trigger is the phrase "launched a bitter attack." In general, opinions can be expressed either directly by words such as "believes" or "argued" (e.g., in "John believes his team will win" and "John argued with his son"), or indirectly through the style and word choices of the language used (e.g., in the sentence "Saddam has repressed his people," the choice of the word "repressed" signals the author's negative opinion of Saddam).

In one case, every opinion expression includes a source (sometimes referred to as the opinion holder). The source is the entity to which the opinion is to be attributed. For example, and as described in greater detail below, opinion extraction logic may be configured to identify the particular span of text (e.g., usually a noun phrase or pronoun) that specifies the entity to which the opinion is to be attributed. In the example, the source is "the Australian Press." If a particular word or phrase cannot be identified as a potential source, the author of the text is presumed to be the opinion holder. In addition, the opinion extraction logic is capable of identifying nested opinion sources. For example, in the example opinion expression 12 of FIG. 1, "[t]he Australian Press" may be thought of as a nested source. That is according to the writer, the Australian Press expressed a negative opinion.

As illustrated in FIG. 1, another attribute of an opinion expression 12 included in an opinion frame 10, is an opinion topic. An opinion topic is the target of opinion, or the subject on which the source is opining. This may be either an entity (e.g., "Italy" in the example of FIG. 1) or a general topic (e.g., "I don't think that lending money to close friends is a good idea").

In one case, each opinion frame includes a field for indicating the polarity of an opinion. The polarity is quite simply the sentiment (e.g., favorability) expressed in the opinion. In one embodiment, the polarity may be either positive (favorable opinion), negative (unfavorable opinion), or neutral (a non-judgmental opinion that does not express a favorable or unfavorable attitude). Under this scheme, the opinion expression illustrated in the example of FIG. 1 would be tagged as "negative."

Finally, in one case, the opinion frame 10 includes a field to indicate the strength of the opinion. The strength field acknowledges that opinions can be expressed with varying degrees of vehemence. For instance, the strength of an opinion may be either low (as in this positive opinion: "I don't think that John is the worst politician that I have ever met"), medium, or high (as in the Australian press example and the following positive opinion: "I think that John is the nicest human being that I have ever met").

In one case, for each component part of an opinion frame there may be an additional field for storing data indicating the position of that particular component of the opinion expression within the document or text being analyzed. For instance, there may be an additional field associated with the opinion source to indicate the position within the text of the opinion source. This additional field may, for example, store one or more byte offset values. These byte offset values may point to or otherwise indicate the relative position within a document where a particular component of an opinion expression is located. For example, the byte offset values may indicate a beginning and ending position, or alternatively, a beginning position and total character length for the particular component (e.g., opinion source, opinion trigger, or opinion topic) of the opinion expression. Accordingly, if an application requests to display a particular opinion expression from a particular document, the byte offset values associated with each component part can be used to retrieve the exact text forming the opinion expression.

After a digital text has been analyzed for the purpose of identifying all opinion expressions within the text, and each opinion expression has been structured as an opinion frame, opinion summaries are formed. In one case, at least two different types of opinion summaries are utilized. The two types of summaries are referred to herein as "overall opinion summaries" and "opinion set summaries". Each type of summary relies on a different mechanism for combining multiple opinions from the same source about the same topic.

Opinion Summaries

FIG. 2 illustrates an example of an overall opinion summary for a sample portion of a document 14, broken down by source and topic. In an overall opinion summary, multiple opinions from a single source on a particular topic are merged into a single aggregate opinion that represents the cumulative opinion of the source on that topic considering the document as a whole. As illustrated in FIG. 2, the sample text 14 includes seven opinion expressions—two negative and one positive opinion from the American public on the war in Iraq, two negative opinions of Bush towards withdrawal from Iraq, and so on. These opinions are aggregated and expressed in the graph-based summary 16. Example text containing opinions and a summary of the opinions are shown in FIG. 2, as sample text 14 and graph-based summary 16. In the text, sources and targets of opinions are bracketed. Opinion expressions are shown in italics and in brackets with associated polarity, either positive (+) or negative (−). In the summary, entities involved in opinions are shown as nodes and aggregated opinions are shown as directed edges, i.e., + and/or −.

Overall opinion summaries allow applications or users to access opinions in an aggregated and standardized form. As such, overall opinion summaries enable certain applications such as question answering (QA). A QA system, for example, might need to answer questions such as "What is entity X's opinion toward topic Y?" Rather than report all of the places in the text where X expresses opinions on topic Y, the QA system only needs to report the overall accumulated opinion from X toward Y in a clean "database" form. Overall opinions might also be employed for opinion-oriented information retrieval, clustering, opinion tracking, document-level opinion exploration, or corpus-level opinion exploration. For instance, with corpus-level opinion exploration, an overall opinion summary might reflect an aggregate opinion for a particular person on a particular topic for an entire corpus of documents.

With overall opinion summaries, there are a variety of ways in which the opinions (particularly, the opinion polarity and strength) may be combined or aggregated to derive the overall opinion summary. For instance, one way in which opinions with common sources and/or topics may be combined is by averaging the opinion polarities, taking into consideration each opinion expression's strength. For instance, if a first opinion has a favorable polarity with an opinion strength score of five, and a second opinion has a favorable polarity with an opinion strength score of three, these opinions may be averaged to arrive at an overall opinion summary with a positive favorable opinion polarity with strength equal to four. In alternative cases, the exact algorithm or formula for averaging the polarity and strength fields may vary. This mechanism for reporting overall opinion summaries is likely to be useful for applications that value capturing an overall trend.

Another way of combining or aggregating opinions to derive opinion polarity and strengths for overall opinion summaries is to report conflicting opinions. For instance, under this scheme, given three possible polarities—positive, negative, and neutral—there are four possible outcomes—positive, negative, neutral or mixed. If a source expresses only positive and neutral opinions on a topic, then the overall polarity is positive (likewise for negative). If a source expresses both positive and negative opinions, then the overall polarity is mixed. If all opinions are neutral, then the overall polarity is neutral. The strength of the overall opinion is an average of the strengths. This model is likely to be useful for applications that need not only the overall trend, but need information on whether any conflicting opinions are expressed.

In yet another method for combining or aggregating opinions to derive opinion summaries, only the strongest opinion is reported, as indicated by the opinion strength field with the highest or greatest magnitude. For instance, using this method, the overall opinion polarity and strength reported in an overall opinion summary is the polarity and strength of the most extreme opinion strength expressed by the source on the particular opinion topic. If two opinion strengths are equal, but with opposite polarities, then the opinion polarity and strength are reported as mixed. This model attempts to capture the strongest opinions as indicated by the underlying sentiment of the source.

In alternative cases, different algorithms may be used to combine or aggregate opinions to generate overall opinion summaries. In particular, the mechanism or algorithm used to extract and combine opinions may be tailored to the particular needs of the application that will utilize the opinion information. Accordingly, only extreme opinions (e.g., opinion expressions with opinion strengths that are high, whether negative or positive) may be extracted or captured as opinion frames. Similarly, in another case, only negative, or, only positive opinions may be extracted and/or combined for purposes of generating opinion summaries.

A second type of opinion summary, referred to herein as an opinion set summary, is simply a collection of multiple opinion expressions from a single source and/or on a particular topic—without analyzing or aggregating the multiple opinions to identify any overall trend. For instance, one type of opinion set summary may combine all opinion expressions that share a common opinion source. Another type of opinion set summary may combine or associate all opinion expressions that are directed to a particular topic. Finally, a third type of opinion set summary may combine or associate all opinion expressions that share in common both the opinion source and opinion topic. For the example text in FIG. 2, an opinion set summary combining all opinion expressions based on source and topic would include, for example, three directed links from American public toward war in Iraq—one for each of the three expressions of opinion.

Opinion set summaries support fined-grained information extraction of opinions as well as user-directed exploration of the opinions within a document. In particular, they can be used to 1) identify all places in a text where entity X expresses an opinion (even though different expressions are used to refer to entity X), or to 2) identify all places in the text where an opinion on topic Y is expressed, without regard for who is expressing the opinion, or to 3) identify all places in the text where an opinion by entity X is being expressed on topic Y. Applications and systems that are concerned with mining the perceived strengths/weaknesses of a given entity (e.g., a product in the case of product reviews, public policies in the case of politicians, or foreign policies in the case of governments) can similarly use opinion set summaries to drive their comparative analyses (e.g., recognize minority opinions—opinions against the overall trend).

In both the overall opinion summary and the opinion set summary, the underlying data structure might retain information from all of the contributing opinion frames to allow exploration of the opinion summary in greater detail. For example, in one case, one or more portions of the opinion summary may be presented in a graphical form as a link (e.g., a line or edge) that joins a node representing the source entity and a node representing the topic entity. Accordingly, when a user clicks on a link in an overall opinion summary, the opinion summary system may highlight those portions of the original document including the opinion trigger from each contributing opinion frame. Similarly, clicking on an opinion source node from either type of summary might cause the system to highlight in the original document all expressions that were used to refer to the source. In general, this allows a user to start with one or more opinion summaries and "drill down" to view the actual text in the analyzed document that was recognized by the system as being relevant for purposes of generating the opinion summary.

Architecture

FIG. 3 illustrates an example of the logical or functional components of a system 30 for identifying, extracting, and summarizing opinions in a document, or a collection of documents. As illustrated in FIG. 3, the overall architecture of the opinion extraction and summarization system 30 includes three layers. The various functional components shown in FIG. 3 may be arranged or combined in a variety of ways without departing from the spirit of the patent application, and as such, the three layers shown are primarily for purposes of conveying the different processing steps. The first layer (i.e., layer one) contains linguistic analysis logic 32 that performs the necessary linguistic analysis of the text. In essence, the linguistic analysis logic 32 performs a collection of pre-processing operations that analyze and manipulate the text in order to prepare the text to be processed by the opinion analysis logic (i.e., layer two). The second layer (layer two in FIG. 3) is referred to as the opinion analysis logic 40 and includes logic that performs the actual extraction and summarization of opinion expressions. For instance, the extraction logic takes as input preprocessed text, and identifies whether individual words or phrases within the text are a component of an opinion expression. Finally, the third layer, which may or may not be integral with layers one and two, is an opinion applications layer. Layer three includes any opinion applications that utilize the data generated by the opinion analysis logic 40, such as applications that may generate queries directed to data generated by the opinion analysis logic 40.

Referring now to layer one of FIG. 3, the linguistic analysis logic 32 includes three logical components: document pre-processing logic 34, syntactic and semantic analysis logic 36, and named entity detection logic 38. In general, the document pre-processing logic 34 receives the digital text from a text input interface component, and then performs a tokenization process to tokenize the text, for example, by identifying word boundaries, punctuation, sentence boundaries, and so on. The document pre-processing logic 34 may generate individual sequences out of each sentence or sentence fragment, where the words make up the sequence elements. Next, the syntactic and semantic analysis logic 36 assigns part of speech tags to words, performs syntactic analysis, for example, by creating a parse tree for each sentence or sentence fragment, identifies grammatical roles for each word or clause—the subject, object, indirect object, and so on—and then finally assigns semantic tags to nouns based on a hierarchy of categories (e.g., "boy" is a person, "pencil" is a tool). The named entity detection logic 38 identifies named entities (typically proper nouns) that denote people, dates, percents, locations, and so on. Accordingly, when the opinion extraction logic 42 is attempting to identify various component parts of an opinion expression, each word in a sequence can be analyzed in the context of the surrounding words and the attributes associated with the surrounding words, as such attributes are assigned by the syntactic and semantic analysis logic 36 and the named entity detection logic 38.

The second layer (layer two in FIG. 3) is referred to as the opinion analysis logic 40 and includes logic that performs the actual identification, extraction and summarization of opinions. The result of this opinion analysis layer is an opinion map data structure with information on each of the individual opinion expressions that are identified in the input document(s) as well as a summary that aggregates all opinions from the same opinion holder and/or about the same topic.

In one case, the opinion analysis logic 40 takes as input an arbitrary text (e.g., document or document snippet) or text collection (e.g., multiple documents or document snippets) and produces a set of opinion frames and one or more opinion map data structures that integrate all of the opinion frames into a summary format. Opinion frames are produced by the opinion extraction logic 42. In one case, there is one opinion frame associated with each opinion expression in the input text and each opinion frame contains five pieces of information, or attributes (as described in connection with FIG. 1), associated with the opinion.

The opinion extraction logic 42 includes subjective language trigger identification logic 44, opinion holder extraction logic 46, and opinion topic extraction logic 48. The subjective language trigger identification logic 44 analyzes the pre-processed text to identify those words that indicate an expression of an opinion (such words referred to herein as opinion triggers). As the text has been preprocessed, the trigger analysis involves more than simply matching the words in the text with a list of words known to be expressive of opinion. For example, the trigger identification logic 44 may analyze each word in the context of the part of speech tags, and so on, which have been assigned to the word being analyzed as well as the surrounding words. In this manner, the trigger language identification logic 44 identifies in context those words and phrases that appear to indicate an expression of opinion. As part of the process, the trigger language identification logic 44 may identify novel subjective expressions, such as expressions that would not be part of any list of words known to be expressive of opinions. Accordingly, those words and phrases expressive of opinion are tagged, so that other extraction logic components can utilize such knowledge in identifying other opinion components, such as the opinion source and/or opinion topic. Similarly, words and/or phrases that have previously been tagged or labeled as an opinion source or opinion topic may be utilized to identify the opinion trigger.

The opinion holder extraction logic 46 identifies the opinion holder or source of each opinion expression associated with an opinion trigger. For example, the opinion holder extraction logic 46 may analyze a sequence of tagged words and phrases to identify those words and phrases positioned within the sequence having certain attributes (as indicated in part by the labeling of words during the pre-processing phase) that indicate such words are expressing an opinion source. Similarly, the topic extraction logic 48 identifies and extracts the topic of each opinion expression. Like the opinion holder extraction logic 46, the topic extraction logic 48 analyzes a sequence of tagged or labeled words and/or phrases, thereby taking in and considering the context of the words in a sentence when attempting to identify and extract the opinion topic.

In one case, each logic component—for example, the trigger identification logic 44, the opinion holder extraction logic 46, and the opinion topic extraction logic 48—may include logic to identify the particular position within the text of the opinion component being analyzed and identified. For instance, the opinion topic extraction logic 48 may assign byte offset values to an extracted opinion topic such that the byte offset values indicate the position of the opinion topic within the document as a whole. Accordingly, applications can utilize the byte offset values to indicate where, in the document, the particular component of the opinion expression was extracted from. For example, an application may display the text of a document with those portions of text forming a particular opinion expression highlighted in a particular color. The byte offset values enable an application to quickly identify the position of the component parts of an opinion expression within the document.

After the opinion extraction logic 42 has identified and extracted the various components of an opinion expression, and generated the opinion frames for a particular document, the opinion summarization logic 52 generates one or more opinion summaries. In one case the goal of the opinion summarization logic 52 is to take the opinion frames that are produced for the text (or for any arbitrary portion of it) and to produce an opinion map that summarizes the opinion frames. The opinion map may be generated by simply associating various opinion frames with one another in a larger data structure, as is conventionally done in the context of a relational database. In any case, the opinion set and/or overall opinion summaries can be directly read off of the resulting opinion map. To generate the opinion map, the opinion holder coreference logic 54 identifies common opinion holders among opinion expressions, particularly where the text of the document uses different words to refer to the same real-world opinion source. For example, the text of a document may first refer to a source with a proper name (e.g., George Bush), and thereafter the source may be referred to using a different word, pronoun or some other title (e.g., Bush, he, or, the President). By analyzing the document and the opinion expressions, the opinion holder coreference logic 54 is able to determine when these different words used in the document are referring to the same real-world source.

Similarly, the topic identification and clustering logic 56 analyzes the document and the opinion expressions in particular to determine when two or more topics, expressed in different words, refer to the same general topic. For example, the topic "Iraq war" and the topic "war in Iraq" are expressed in different words or arrangement of words, but are in essence the same general topic. The topic identification and clustering logic 56 determines when the same topic has been expressed with different words, and associates different opinion frames on this basis to form opinion summaries.

The final layer of the architecture includes any applications that use the opinion map produced during opinion analysis or display it in various forms for the end user. This layer includes applications, for example, that allow one to search a single document, a document collection or a document corpus for opinions and/or to browse an opinion map. In addition, applications may produce opinion timelines that show how opinions by a particular opinion holder or about a particular topic have changed over time, or create opinion tickers that analyze or "watch" an input stream (of documents) for opinions with particular characteristics.

Method for Generating Opinion Summaries

Figure 4:
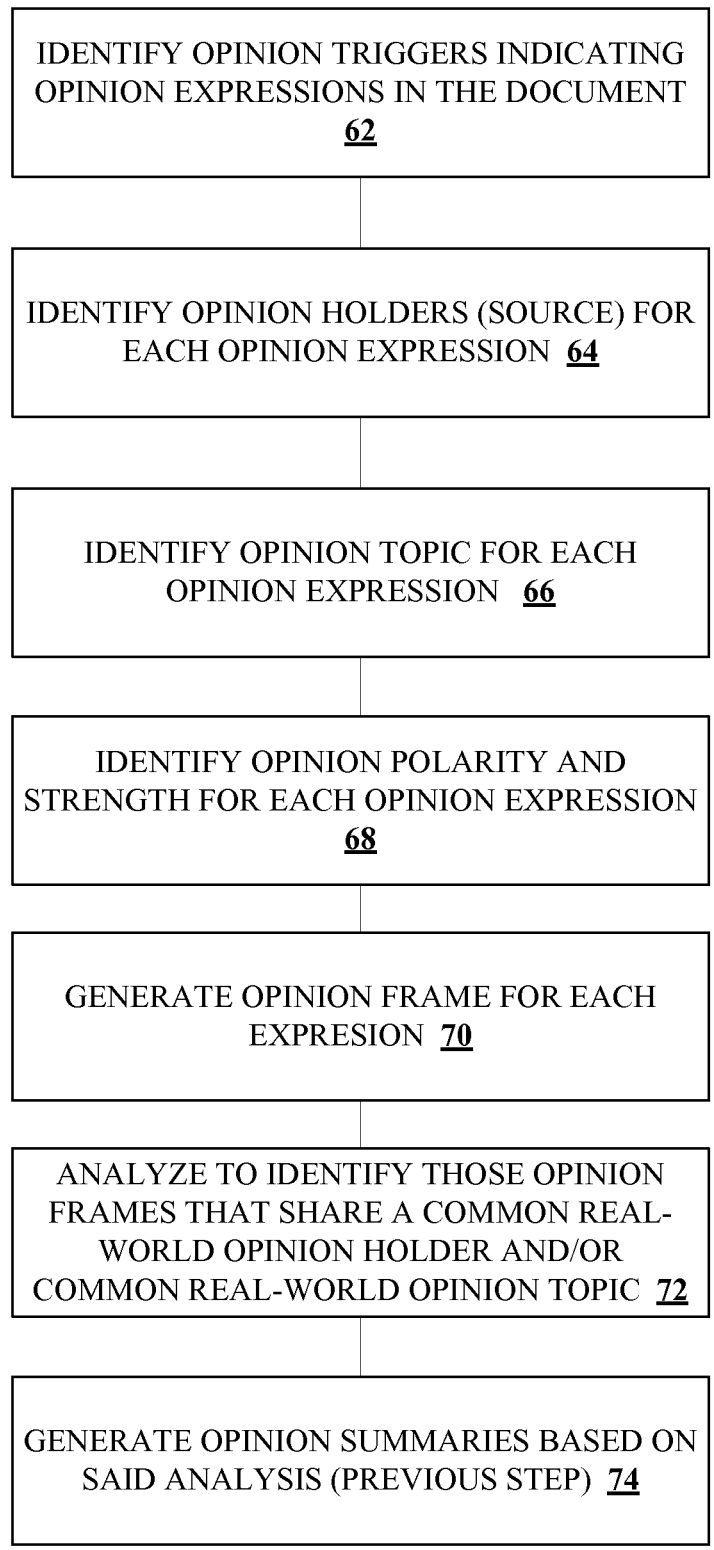
FIG. 4 illustrates an example of a method for analyzing a document to generate opinion summaries.

As illustrated in FIG. 4, a method for generating opinion summaries from a digital text involves several discrete processing steps or operations. Those skilled in the art of natural language processing will appreciate that several operations of the method (e.g., identifying the component parts of an opinion expression/frame) share in common several underlying principles. As described in greater detail below, the problem of identifying the component parts of an opinion expression is approached as a problem of tagging or labeling a sequence of words (assigning, for example, a '+' if the word is part of an opinion trigger phrase and a '−' if the word is not part of an opinion trigger phrase). As such, the mechanism for identifying the component parts of an opinion expression may be a trained model based on conditional random fields (CRFs)—a type of discriminative probabilistic model frequently used for the labeling or parsing of sequential data such as natural language text (in this case, the words of the input text). CRFs are an example of a statistical, or machine learning algorithm, many of which could be employed for the task. In particular, CRFs are a type of supervised machine learning algorithm. This class of learning algorithm requires a (usually manually) annotated training corpus for the task being learned. To construct a model that identifies opinion trigger phrases, for example, a supervised learning algorithm needs a corpus of training texts in which opinion trigger phrases have already been identified (i.e., annotated). In the case of CRFs, the trained sequence tagging model then assigns the most likely sequence of tags to the words of an input sentence by relying on the relative frequency of occurrence of similar word and tag sequences seen in the training data sequences. In addition to taking into consideration the sequences of word-tag pairings seen in the training data, the CRF model can also take into consideration other features of the context that appeared in the training sequences when making its tagging decisions, for example, is there a sentiment-bearing word anywhere within a window of three words to either side of the word being tagged or does the word being tagged appear to be part of a noun phrase? Based on the training data, the system knows which features are correlated with which tags and the model can use this information to make tagging decisions for the words of novel sentences, for instance, sentences that were not part of the initial training data.

In one case, CRFs are used to identify opinion triggers, to identify opinion sources, and to identify polarity and intensity.

Those skilled in the art of natural language processing will appreciate that the above described approach (using CRFs as the supervised learning algorithm) is but one of many possible approaches consistent with the spirit of the patent application. The methods for identifying the various component parts of an opinion expression may be achieved in alternative ways. Instead of CRFs, for example, a different kind of sequence-based tagging model could also be employed (e.g., hidden Markov models or structured support vector machines (SVMs)). Alternatively, a classification-based approach to supervised learning might be employed (e.g., SVMs, maximum entropy models, decision tree algorithms, naïve Bayes, k-nearest neighbor) to assign the appropriate source, trigger, topic, polarity, and intensity labels to individual words in context. As with the CRF approach, the classification-based approaches require training data with the correct labels from which to learn. In contrast, semi-supervised and unsupervised learning algorithms may be used in place of the supervised learning methods described thus far. These two classes of learning algorithms differ from fully supervised methods in the amount of annotated training data that they require: semi-supervised methods learn models from a combination of annotated and unannotated data; unsupervised methods learn models from only unannotated data. Pattern-learning algorithms from the field of Information Extraction would be yet another choice for identifying opinions and their attributes. Finally, a system based on manually derived extraction rules might be used to identify opinion components.

Although FIG. 4 shows the various method operations occurring in sequence, it will be appreciated by those skilled in the art that the processing steps need not occur in sequence, but may occur simultaneously, or alternatively, in an iterative manner. For instance, the process of identifying the various component parts of an opinion expression (e.g., method operations 62, 64, 66 and 68) occur simultaneously or in parallel. Accordingly, the various logic components are working simultaneously to determine which words and phrases make up the various component parts of an opinion expression. Furthermore, the process may be iterative. Using an iterative process, for example, a particular word or phrase may first be considered one particular component of an opinion expression (e.g., an opinion source), and during a second pass of the processing logic, the same word or phrase may be considered a different component of an opinion expression (e.g., an opinion topic). A final processing step may determine an optimal label for the particular word or phrase based on a determination of previously calculated probabilities. For example, integer linear programming techniques from the field of operations research are used to perform this final processing step.

Opinion Trigger Identification

As illustrated in FIG. 4, one method operation 62 included in a method for generating an opinion frame is identifying the opinion trigger in the text. An opinion trigger is a word, words, or phrase that, in the context of the text being analyzed, indicates an expression of an opinion. For example, consider the four sample sentences with opinion triggers underlined below:

1: Minister Vedrine "criticized" the White House reaction.

2: 12 persons were killed by sharpshooters "faithful to" the president.

3: Tsvangirai "said" the election result was "illegitimate" and a clear case of "highway robbery."

4: Criminals have been "preying" on Korean travelers in China.

To understand, extract, or answer questions about the opinions in these sentences, an opinion analysis system must determine the basic attributes of the opinion: Is its polarity positive, negative, or neutral? With what strength or intensity is the opinion expressed: mild, medium, strong or extreme? Who or what is the source, or holder, of the opinion? What is its target, that is, what is the opinion about? The opinion expressions (marked in quotes) in the above example sentences are the keys to answering these questions. In particular, the marked phrases denote the polarity of the opinion: for example, "criticized" and "faithful to" (examples 1 and 2 above) denote negative and positive attitudes, respectively. The opinion expressions also often provide linguistic anchors for the automatic extraction of the opinion source and topic of the opinion. The predicate "criticized", for example (in example 1), organizes the semantic roles that denote the source of the opinion (the agent role="Minister Vedrine") and the target of the opinion (the object/theme role="White House reaction"). Similarly, the opinion expression "faithful to" organizes the semantic roles associated with the source (the agent role="sharpshooters") and the target (the object/theme role="the president") of the opinion expressed in example sentence 2 above.

For purposes of this patent application, opinion triggers can be characterized into one of two categories or classifications. Direct subjective expressions (DSEs) are spans of text that explicitly express an attitude or opinion. "Criticized" and "faithful to" (examples 1 and 2 above), for example, directly denote negative and positive attitudes towards the "White House reaction" and "the president", respectively. Speech events like "said" in example 3 can be DSEs if the proposition it introduces (e.g., the thing being said) expresses subjectivity. In contrast, expressive subjective elements (ESEs), shown in quotes, are spans of text that indicate, merely by the specific choice of words, a degree of subjectivity on the part of the speaker. The phrases "illegitimate" and "highway robbery", for example, indirectly relay Tsvangirai's negative opinion of "the election result" (example 3), and the use of "preying on" (instead of, say, "mugging") indicates the writer's sympathy for the Korean travelers in sentence example 4 (above).

To identify the opinion trigger, many features derived from the first layer of the architecture (linguistic analysis logic 32) may be used. In one case, the following features are useful: coarse part-of-speech tags (e.g., noun, verb, adjective, adverb, determiner, preposition, punctuation), the words in a one-word window centered on the word being tagged, the WordNet hypernym, whether or not the word is in a lexicon (or list) of possible opinion words, the type of constituent that the word is part of based on a syntactic analysis of the sentence, the out-of-context polarity and intensity of the word, whether or not a negation term (e.g. "not", "neither", "lack of") is in the vicinity, distance of the word to the nearest extracted span of text, the number of positive words in the sentence, the number of negative words in the sentence, the number of neutral words in the sentence, the number of strong (intensity) words in the sentence, the number of weak (intensity) words in the sentence, whether or not the word or its predecessor is a strong modal (e.g. "must", "will"), whether or not the word or its predecessor is a weak modal (e.g. "may", "could"), whether or not the word or its predecessor is an intensifier (e.g. "really", "extremely"), whether or not the word or its predecessor is a diminsher (e.g. "little", "somewhat").

Opinion Holder/Source Identification

Referring again to FIG. 4, another operation in a method for generating opinion summaries is to identify the opinion holder or source 64 for each opinion trigger identified in operation 62. Identifying opinion sources is especially critical for opinion-oriented question and answering systems (e.g., systems that answer questions of the form "How does [X] feel about [Y]?") and opinion-oriented summarization systems, both of which need to distinguish the opinions of one source from those of another. The opinion holder extraction logic 48 identifies direct and indirect sources of opinions, emotions, sentiments, and other private states that are expressed in text. To illustrate the nature of this problem, consider the examples below:

S1: Taiwan-born voters favoring independence . . .

S2: According to the report, the human rights record in China is horrendous.

S3: International officers believe that the EU will prevail.

S4: International officers said US officials want the EU to prevail.

In S1 above, the phrase "Taiwan-born voters" is the direct (i.e., first-hand) source of the "favoring" sentiment. In S2, "the report" is the direct source of the opinion about China's human rights record. In S3, "International officers" are the direct source of an opinion regarding the EU. The same phrase in S4, however, denotes an indirect (i.e., second-hand, third-hand, etc.) source of an opinion whose direct source is "US officials".

In one case, opinion source identification is viewed as a sequence tagging task. As a result, CRFs are one type of algorithm that may be used to extract opinion sources. They are applied in much the same manner as described above for opinion trigger extraction. In particular, a similar set of features may be employed: the words in a [−4, +4] window centered on the word being tagged; part-of-speech tags in a [−2, +2] window; the grammatical role (subject, object, prepositional phrase types) of the constituent that the word appears is derived from a statistical parse; whether or not the word or the head of its parent in the parse tree are in the opinion expression dictionary culled from the training data and a short list of (approximately 500) opinion words; whether or not each of the words in a [−1, +1] window are in the opinion expression dictionary culled from the training data and the short list of opinion words; the general semantic class of the word being tagged; the WordNet hypernym of the word being tagged.

Opinion Topic Identification

Method operation 66 involves identifying the opinion topic for each opinion expression. Although a sequence-tagging approach might be reasonable for identifying topic phrases, a sentence-level text categorization approach is employed. The words in the sentence that contain the opinion trigger are classified automatically according to which, of a fixed set of topics the sentence describes. For example, a set of approximately 365 topics derived from Factiva's topic hierarchy may be employed as the list of allowable topics.

As in the case of the other opinion components, any type of classifier (including manually constructed ones) may be trained to model the categories. For example, support vector machines (SVMs) are used because of their successful application in a variety of text categorization tasks. Accordingly, one SVM model is trained to represent each category. In alternative cases, a single multi-class classifier may be trained. In one case, the training set is created from a collection of documents that are labeled, a priori, with respect to those categories in the predefined topic list that are addressed in the document. The collection, for example, may be created by retrieving from Factiva a set of documents whose labels collectively cover all of the topic categories.

Training instances can then be derived from the document-labeled collection. More specifically, there will be one training example created for every sentence in the collection. As is standard practice in text categorization, each training instance is a vector of tf–idf values, one for each distinct word that appears in the collection. Those skilled in the art of natural language processing will recognize tf–idf weighting as a standard strategy for assigning weights to individual terms in a document according to (a) the number of times the term appears in the document (i.e., the tf or term frequency) and (b) the inverse of number of documents that the term appears in across the collection (i.e., the idf or inverse document frequency). The tf–idf weights attempt to balance the importance of a term (tf) with its ability to distinguish one document from another (idf). In the case of topic categorization, each sentence is treated as a document when calculating tf–idf values. Other implementations might employ more sophisticated features to good use. The supervisory labels assigned to each training instance (i.e., each sentence) are all of the topics assigned to the article. For example, the sentences themselves are tagged (e.g., manually annotated) with the correct subset of the document-level topics to improve the training process. After training the topic models classifiers, they can be applied to tf–idf vectors created for any sentence that contains an opinion expression to determine which of the topic categories are represented in the sentence.

Determining Opinion Polarity and Strength

At method operation 68, the opinion polarity and strength are determined. The case of polarity and strength extraction is similar to that of opinion trigger extraction. Although a variety of methods may suffice, in one case CRFs are employed to label the words of the sentence according to polarity and strength (or "none" if the word does not provide polarity or strength cues) using the same feature set as described above for the case of opinion trigger identification.

Creation of Opinion Frames

At method operation 70, the various components of the opinion identified in operations 62 through 68 (described above) are utilized to form an opinion frame for each opinion expression. Method operation 70 may be achieved via different mechanisms. For example, creating opinion summaries, in general, may be achieved via heuristics, rule-based pattern matching systems, or statistical learning systems. In one case, polarity and strength values are assigned to each opinion trigger by observing the polarity and strength labels (from the polarity and strength taggers) that overlap with opinion trigger phrases. In this case, all that remains to complete the opinion frame is to determine which source expressions should be grouped with which opinion triggers. Although this might initially appear to be a simple case of linking opinion trigger and source expressions that appear in a single sentence, there are complications that limit the applicability of this kind of heuristic approach. Consider the following sentences:

S1: [Bush]$^{(1)}$ intends$^{(1)}$ to curb the increase in harmful gas emissions and is counting on$^{(1)}$ the good will$^{(2)}$ of [US industrialists]$^{(2)}$.

S2: By questioning$^{(3)}$ [the Imam]$^{(4)}$'s edict$^{(4)}$ [the Islamic Republic of Iran]$^{(3)}$ made [the people of the world]$^{(5)}$ understand$^{(5)}$ . . . .

The underlined phrases above are opinion triggers; phrases marked with square brackets are sources. The numeric superscripts on these entities indicate "link" relations. For example, source$^i$ is the source of the opinion expressed via opinion trigger$^i$. For instance, the source entity "Bush" and the opinion trigger "intends" satisfy the link relation, and so do "Bush" and "counting on." Notice that a sentence may contain more than one link relation, and link relations are not one-to-one mappings between sources and opinion triggers. Also, the pair of entities in a link relation may not be the closest entities to each other, as is the case in the second sentence with "questioning" and "the Islamic Republic of Iran."

The extraction of opinion link relations is generally a critical step for many opinion-oriented natural language processing applications. For instance, consider the following question that might be given to a question-answering system: "What is the Imam's opinion toward the Islamic Republic of Iran?" Without opinion link analysis, the question-answering system might mistake example S2 as relevant to the query, even though S2 exhibits the opinion of the Islamic Republic of Iran toward Imam, not the other way around.

Because of the issues described above, the system may create opinion frames from the extracted trigger, source, polarity, intensity, and link information using integer linear programming (ILP), an optimization method often utilized in operations research. In this setting, the opinion trigger tagger is allowed to hypothesize the existence of a number of opinion triggers in each sentence. Each opinion trigger hypothesis further has an associated confidence score (e.g., a probability). For example, the system might keep the n-best (highest scoring) opinion trigger sequences in the sentence; or it might keep all hypotheses with scores above a specific value. In one case, each opinion trigger hypothesis is then assigned polarity and intensity values as described above. Alternatively, the n-best polarity and intensity sequences could be identified and incorporated into the opinion frames using the ILP approach. In the same way, the source tagger is used to identify the n-best opinion source sequences for a sentence.

Finally, a link relation classifier is built. It is trained and tested on all pairs of opinion trigger and source entities, $O_i$ and $S_j$, extracted from the aforementioned n-best opinion trigger and source sequences. The relation classifier may be modeled using any of a number of statistical learning methods, or heuristic-based methods, or pattern-learning systems. In one case, the relation classifier is modeled using Markov order-0 CRFs, which are equivalent to maximum entropy models. It is trained using only local syntactic information potentially useful for connecting a pair of entities, but has no knowledge of nearby or neighboring extracted entities and link relations. In one case, the following features may be employed by the link relation learning algorithm:

words: the words contained in the opinion trigger, $O_i$ phrase type: the syntactic category of the constituent in which the opinion trigger and source are embedded, respectively (e.g., NP or VP). Separate features are encoded for the opinion trigger, $O_i$, and for the source, $S_j$.

grammatical role: the grammatical role of the constituent in which the entity is embedded. Separate features are encoded for $O_i$ and $S_j$.

position: a boolean value indicating whether $S_j$ precedes $O_i$.

distance: the distance between $O_i$ and $S_j$ in numbers of tokens. For example, four coarse categories may be used: adjacent, very near, near, far.

voice: whether the voice of $O_i$ is passive or active (or neither).

syntactic frame: a set of features that indicates whether key intra-sentential relations between $O_i$ and $S_j$ exist, e.g., the distance (adjacent, very near, near, far) between the grammatical role realizations of $O_i$ and $S_j$; the distance (adjacent, very near, near, far) between the constituent realizations of $O_i$ and $S_j$; source-constituent-type/opinion-headword pairings that appeared during training; source-grammatical-role-type/opinion-headword pairings; and the presence or absence of possibly non-contiguous syntactic patterns of the following form that appeared in the training set: opinion/source-constituent-type:NP:opinion/source-constituent-type; opinion/source-constituent-type:VP:opinion/source-constituent-type; opinion/source-constituent-type:wh-word:opinion/source-constituent-type.

According to one embodiment, to create the opinion frames for each sentence using ILP, an integer linear programming problem is formulated for each sentence using the results from the opinion trigger tagger, the source tagger, and the link relation classifier. In particular, a number of soft and hard constraints among link relations and trigger and/or source entities are specified that take into account the confidence values provided by the supporting entity and relation classifiers, and that encode a number of heuristics to ensure coherent output. In one case, the following constraints are used: only one link can emanate from an opinion trigger; a source can link to at most two opinion trigger expressions; sources cannot overlap with one another or with opinion triggers; opinion triggers cannot overlap with one another or with sources.

Given these constraints, global inference via ILP finds the optimal, coherent set of opinion-source pairs by exploiting mutual dependencies among the entities and relations. Each identified source-trigger pairing comprises an opinion frame, and is stored as such via a simple data structure or in a relational database along with the associated polarity and strength information for the opinion trigger.

Source and Topic Coreference Resolution

At method operation 72, the opinion frames are analyzed to identify those opinion frames that share a common real-world opinion source and/or opinion topic. These tasks are referred to as "source coreference resolution" and "topic coreference resolution", respectively.

If topics are identified and categorized using the text categorization techniques described above, the task of topic coreference is not difficult: all opinion frames with the same topic label are considered coreferent for the purposes of summarization. The same method for topic coreference resolution can be employed if topic spans are identified and categorized at the same time, e.g., via a sequence tagging algorithm. Otherwise, the method below or alternatives can be used to determine which topic spans are coreferent.

At first glance, source coreference resolution appears equivalent to the more general task of noun phrase coreference resolution—the task of identifying which noun phrases in a document refer to the same real-world entity. And source coreference resolution can, in fact, be treated as noun phrase coreference. In this setting, 1) any available noun phrase coreference resolution system is applied to create the coreference "chain" of noun phrases for each entity; and then 2) any phrases that do not correspond to opinion sources are discarded from each coreference chain.

Depending upon the particular embodiment, the noun phrase coreference logic may be a manually built rule-based system or an unsupervised clustering algorithm. Alternatively, supervised learning algorithms may be employed:

a classifier is trained to determine whether or not two noun phrases appear to be coreferent based on information in the noun phrases themselves (e.g., do they exhibit the same gender, number, semantic class?) and the contexts in which they appear (e.g., is one phrase in apposition with respect to the other as in "[George Bush];[president of the U.S.]"?);

the classifier is applied to (possibly all) pairs of noun phrases in the test document to make a decision as to the likelihood of their being coreferent; and;

a clustering algorithm is used to coordinate the possibly conflicting coreference decisions from the previous step (e.g., the classifiers might indicate that A is coreferent with B, and that B is coreferent with C, but that C is not coreferent with A, which cannot happen in the real world).

When using the above machine learning approach, one disadvantage of treating source coreference as a type of noun phrase coreference is that training data will be required for the full noun phrase coreference task—the coreference chains associated with each entity will need to be annotated in the training data. This is generally a time consuming manual task.

Alternatively, the source coreference resolution task can be tackled directly, for instance, without first identifying the noun phrase coreference chains. A machine learning approach similar to the one described above may be used, but applied only to noun phrases known or presumed to be opinion sources. In this case, the training data would only require annotating coreference links among phrases identified as source noun phrases. As described above, the learning-based system could be replaced by a rule-based system or a clustering algorithm.

The foregoing description of various implementations has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The system may be implemented in hardware, software, or a combination thereof. When implemented partly in software, the system may be embodied as instructions stored on a computer- or machine-readable medium. In general, the scope of the invention is defined by the claims and their equivalents.

The invention claimed is:

1. A computer-implemented method, using a hardware processor, for generating an opinion summary from a digital text, said method comprising:

using at least one of syntactic analysis, semantic analysis and discourse analysis to assist in automatically extracting a plurality of opinion expressions from the digital text using the processor, each opinion expression identified by a grammatical element and associated with an opinion source to which the opinion expression is to be attributed, an opinion topic, an opinion polarity and an opinion strength, wherein for each opinion expression the opinion source is at least one person or entity to which such opinion expression is to be attributed, and wherein the digital text includes opinions expressions from a plurality of opinion sources;

identifying those opinion expressions that share a common opinion source and a common opinion topic using the processor; and combining the opinion polarities and opinion strengths of those opinion expressions that share a common opinion source to form an overall opinion summary with one aggregate opinion frame for each common opinion source-topic pairing.

2. The computer-implemented method of claim 1, wherein identifying those opinion expressions that share a common opinion source includes identifying those opinion expressions that have a common real-world opinion source expressed in the digital text with different language.

3. The computer-implemented method of claim 1, wherein identifying those opinion expressions that share a common opinion topic includes identifying those opinion expressions that have a common real-world opinion topic expressed in the digital text with different language.

4. The computer-implemented method of claim 1, further comprising:

for those opinion expressions that share a common opinion source and common opinion topic, generating an overall opinion summary having opinion polarities and opinion strengths based on averaging those opinion polarities of the opinion expressions that share the common opinion source and common opinion topic, wherein the averaging takes into consideration the opinion strength associated with each opinion polarity.

5. The computer-implemented method of claim 1, further comprising:

for those opinion expressions that share a common opinion source and a common opinion topic, generating an overall opinion summary having an opinion polarity and opinion strength based on the opinion polarity and opinion strength of the opinion expression identified as having a most extreme opinion polarity and opinion strength of the opinion expressions that share a common opinion source and common opinion topic.

6. The computer-implemented method of claim 1, further comprising:

for those opinion expressions that share a common opinion source and a common opinion topic, generating an overall opinion summary which indicates whether there is a conflict between any two opinion polarities of any two opinion expressions that share a common opinion source and common opinion topic.

7. The computer-implemented method of claim 1, wherein each opinion expression is associated with at least one of an author and a publisher of the digital text in which the opinion expression is located.

8. The computer-implemented method of claim 1, wherein the grammatical element is at least one of a word, a plurality of words, and a phrase.

9. The computer-implemented method of claim 1, further comprising:

for each overall opinion summary associated with a unique opinion source, determining a number of at least one of positive opinion expressions and negative opinion expressions associated with the unique opinion source.

10. The computer-implemented method of claim 1, further comprising:

for each overall opinion summary associated with a unique opinion source, determining a percentage of at least one of positive opinion expressions and negative opinion expressions associated with the unique opinion source.

11. A computer-implemented method, using a hardware processor, for generating an opinion summary from a digital text, said method comprising:

using at least one of syntactic analysis, semantic analysis and discourse analysis to assist in automatically extracting a plurality of opinion expressions from the digital text using the processor, each opinion expression identified by a grammatical element and associated with an opinion source to which the opinion expression is to be attributed, an opinion topic, an opinion polarity and an opinion strength, wherein for each opinion expression the opinion source is at least one person or entity to which such opinion expression is to be attributed, and wherein the digital text includes opinions expressions from a plurality of opinion sources;

organizing the plurality of opinion expressions into data fields, including an opinion source field, using the processor;

identifying those opinion expressions that share a common opinion topic using the processor; and generating an opinion summary with one aggregate opinion frame for each unique opinion topic, wherein the opinion summary is based at least in part on combining the opinion polarities and opinion strengths of those opinion expressions that share the common opinion topic.

12. The computer-implemented method of claim 11, wherein identifying those opinion expressions that share a common opinion topic includes identifying those opinion expressions that have a common real-world opinion topic expressed in the digital text with different language.

13. The computer-implemented method of claim 11, further comprising:
for those opinion expressions that share a common opinion topic, generating an overall opinion summary having opinion polarities and opinion strengths based on averaging those opinion polarities of the opinion expressions that share the common opinion topic, wherein the averaging takes into consideration the opinion strength associated with each opinion polarity.

14. The computer-implemented method of claim 11, further comprising:
for those opinion expressions that share a common opinion topic, generating an overall opinion summary having an opinion polarity and opinion strength based on the opinion polarity and opinion strength of the opinion expression identified as having a most extreme opinion polarity and opinion strength of the opinion expressions that share a common opinion topic.

15. The computer-implemented method of claim 11, further comprising:
for those opinion expressions that share a common opinion topic, generating an overall opinion summary which indicates whether there is a conflict between any two opinion polarities of any two opinion expressions that share a common opinion topic.

16. The computer-implemented method of claim 11, further comprising:
for each overall opinion summary associated with a unique topic, determining at least one of a number of and a percentage of at least one of positive opinion expressions and negative opinion expressions directed toward the unique topic.

17. A computer-implemented method, using a hardware processor, for generating an opinion summary from a digital text, said method comprising:
using at least one of syntactic analysis, semantic analysis and discourse analysis to assist in automatically extracting a plurality of opinion expressions from the digital text using the processor, each opinion expression identified by a grammatical element and associated with an opinion source to which the opinion expression is to be attributed, an opinion topic, an opinion polarity and an opinion strength, wherein for each opinion expression the opinion source is at least one person or entity to which such opinion expression is to be attributed, and wherein the digital text includes opinions expressions from a plurality of opinion sources;
identifying those opinion expressions that share a common opinion source using the processor; and
combining the opinion polarities and opinion strengths of those opinion expressions that share a common opinion source to form an overall opinion summary with one aggregate opinion frame for each common opinion source.

18. The computer-implemented method of claim 17, wherein identifying those opinion expressions that share a common opinion source includes identifying those opinion expressions that have a common real-world opinion source expressed in the digital text with different language.

19. The computer-implemented method of claim 17, further comprising:
for those opinion expressions that share a common opinion source, generating an overall opinion summary having opinion polarities and opinion strengths based on averaging those opinion polarities of the opinion expressions that share the common opinion source, wherein the averaging takes into consideration the opinion strength associated with each opinion polarity.

20. The computer-implemented method of claim 17, further comprising:
for those opinion expressions that share a common opinion source, generating an overall opinion summary having an opinion polarity and opinion strength based on the opinion polarity and opinion strength of the opinion expression identified as having a most extreme opinion polarity and opinion strength of the opinion expressions that share a common opinion source.

21. The computer-implemented method of claim 17, further comprising:
for those opinion expressions that share a common opinion source, generating an overall opinion summary which indicates whether there is a conflict between any two opinion polarities of any two opinion expressions that share a common opinion source.

22. The computer-implemented method of claim 17, further comprising:
for each overall opinion summary associated with a unique opinion source, determining at least one of a number of and a percentage of at least one of positive opinion expressions and negative opinion expressions associated with the unique opinion source.

23. A computer-implemented method, using a hardware processor, for identifying and grouping opinion expressions, said method comprising:
using at least one of syntactic analysis, semantic analysis and discourse analysis to assist in automatically extracting a plurality of opinion expressions from a digital text using the processor, each opinion expression identified by a grammatical element and associated with an opinion source to which the opinion expression is to be attributed, an opinion topic, an opinion polarity and an opinion strength, wherein for each opinion expression the opinion source is at least one person or entity to which such opinion expression is to be attributed, and wherein the digital text includes opinions expressions from a plurality of opinion sources;
identifying and grouping those opinion expressions that share a common opinion source and a common opinion topic using the processor; and
presenting the grouped opinion expressions on a display, wherein the grouped opinion expressions are based at least in part on combining the opinion polarities and opinion strengths of those opinion expressions that share a common opinion source to form an overall opinion summary with one aggregate opinion frame for each common opinion source-topic pairing.

24. The computer-implemented method of claim 23, wherein identifying and grouping those opinion expressions that share at least one of a common opinion source and a common opinion topic includes identifying those opinion expressions that have at least one of a common real-world opinion source and a common real-world opinion topic expressed in the digital text with different language.

25. The computer-implemented method of claim 23, wherein identifying and grouping those opinion expressions that share at least one of a common opinion source and a common opinion topic includes identifying those opinion expressions that have a common real-world opinion topic expressed in the digital text with different language.

26. The computer-implemented method of claim 23, further comprising:

for those opinion expressions that share a common opinion source and a common opinion topic, generating an overall opinion summary having opinion polarities and opinion strengths based on averaging those opinion polarities of the opinion expressions that share the common opinion source and common opinion topic, wherein the averaging takes into consideration the opinion strength associated with each opinion polarity.

27. The computer-implemented method of claim 23, further comprising:
for those opinion expressions that share a common opinion source and a common opinion topic, generating an overall opinion summary having an opinion polarity and opinion strength based on the opinion polarity and opinion strength of the opinion expression identified as having a highest opinion polarity and opinion strength of the opinion expressions that share a common opinion source and a common opinion topic.

28. The computer-implemented method of claim 23, further comprising:
for those opinion expressions that share a common opinion source and a common opinion topic, generating an overall opinion summary which indicates whether there is a conflict between any two opinion polarities of any two opinion expressions that share a common opinion source and opinion topic.

29. A non-transitory computer-readable storage medium storing a set of instructions for an execution via a processing circuit, wherein said execution implementing a method for generating an opinion summary from a digital text, the method comprising:
using at least one of syntactic analysis, semantic analysis and discourse analysis to assist in automatically extracting a plurality of opinion expressions from the digital text, each opinion expression identified by a grammatical element and associated with an opinion source to which the opinion expression is to attributed, an opinion topic, an opinion polarity and an opinion strength, wherein for each opinion expression the opinion source is at least one person or entity to which such opinion expression is to be attributed, and wherein the digital text includes opinion expressions from a plurality of opinion sources; and
identifying and grouping those opinion expressions that share a common opinion source and a common opinion topic; and
combining the opinion polarities and opinion strengths of those opinion expressions that share a common opinion source to form an overall opinion summary with one aggregate opinion frame for each common opinion source-topic pairing.

* * * * *

UNITED STATES PATENT AND TRADEMARK OFFICE
CERTIFICATE OF CORRECTION

PATENT NO. : 9,092,514 B2  Page 1 of 1
APPLICATION NO. : 13/629004
DATED : July 28, 2015
INVENTOR(S) : Claire Cardie et al.

It is certified that error appears in the above-identified patent and that said Letters Patent is hereby corrected as shown below:

Title Page, second inventor, should read, (72)

Veselin Stoyanov, Ithaca, NY (US)

Signed and Sealed this
Eighth Day of March, 2016

Michelle K. Lee
*Director of the United States Patent and Trademark Office*